May 7, 1963 M. G. HUNTINGTON 3,088,816
METHOD AND APPARATUS FOR THE DRY ASH GENERATION
OF HYDROGEN AND CARBON MONOXIDE GASES
FROM SOLID FUELS
Filed Dec. 9, 1960 6 Sheets-Sheet 2

INVENTOR
MORGAN G. HUNTINGTON

BY Sughrue, Rothwell, Mion and Zinn
ATTORNEYS

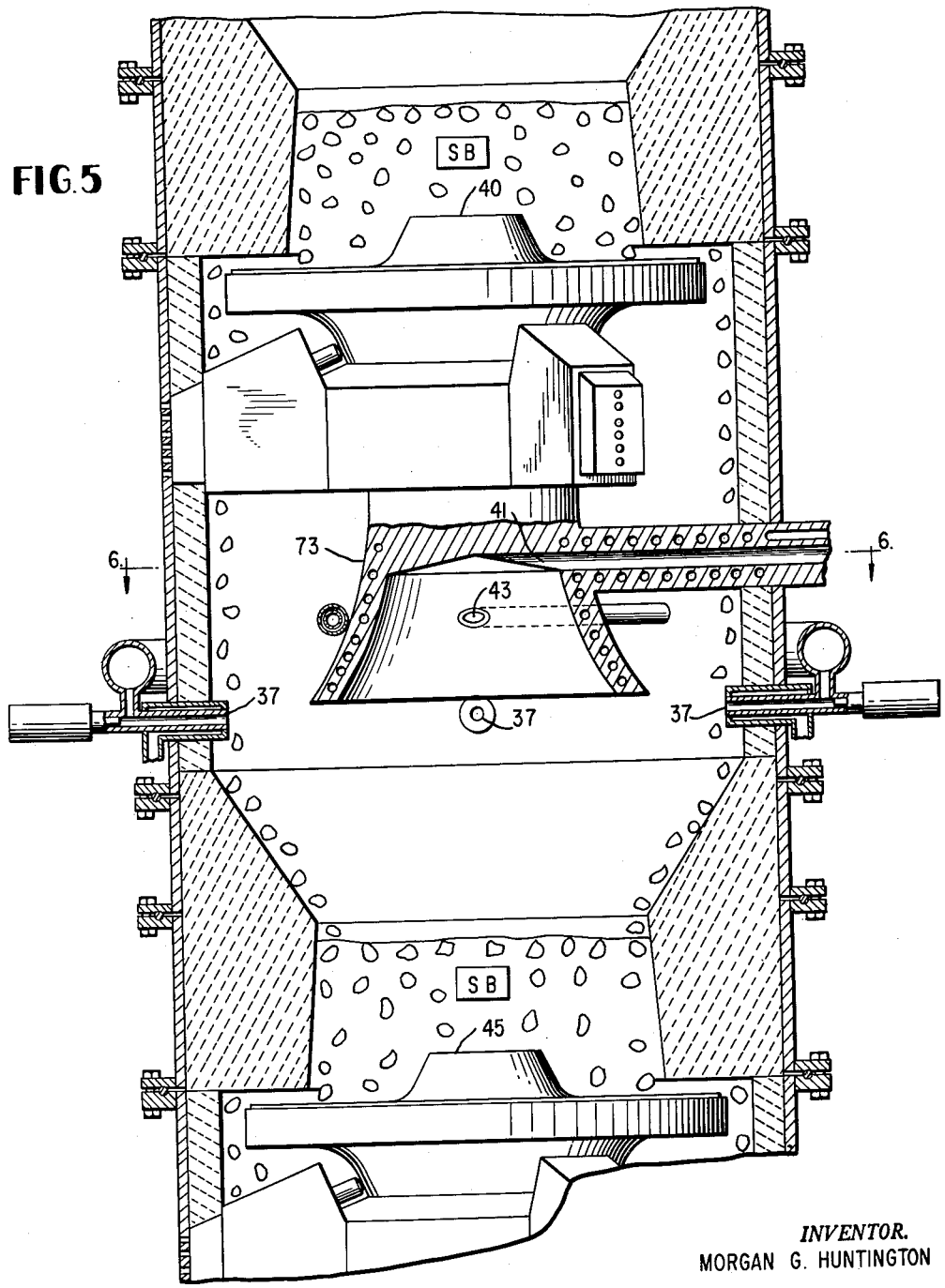

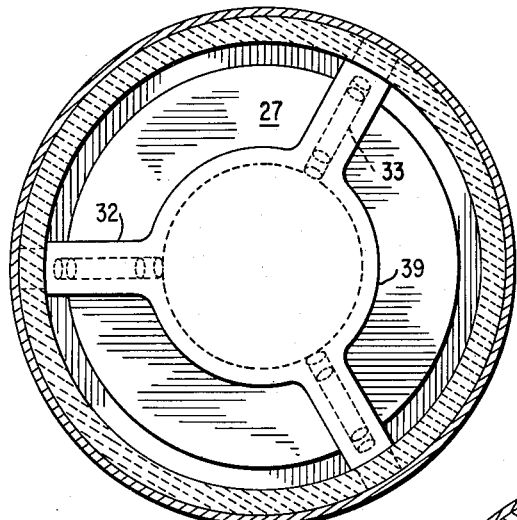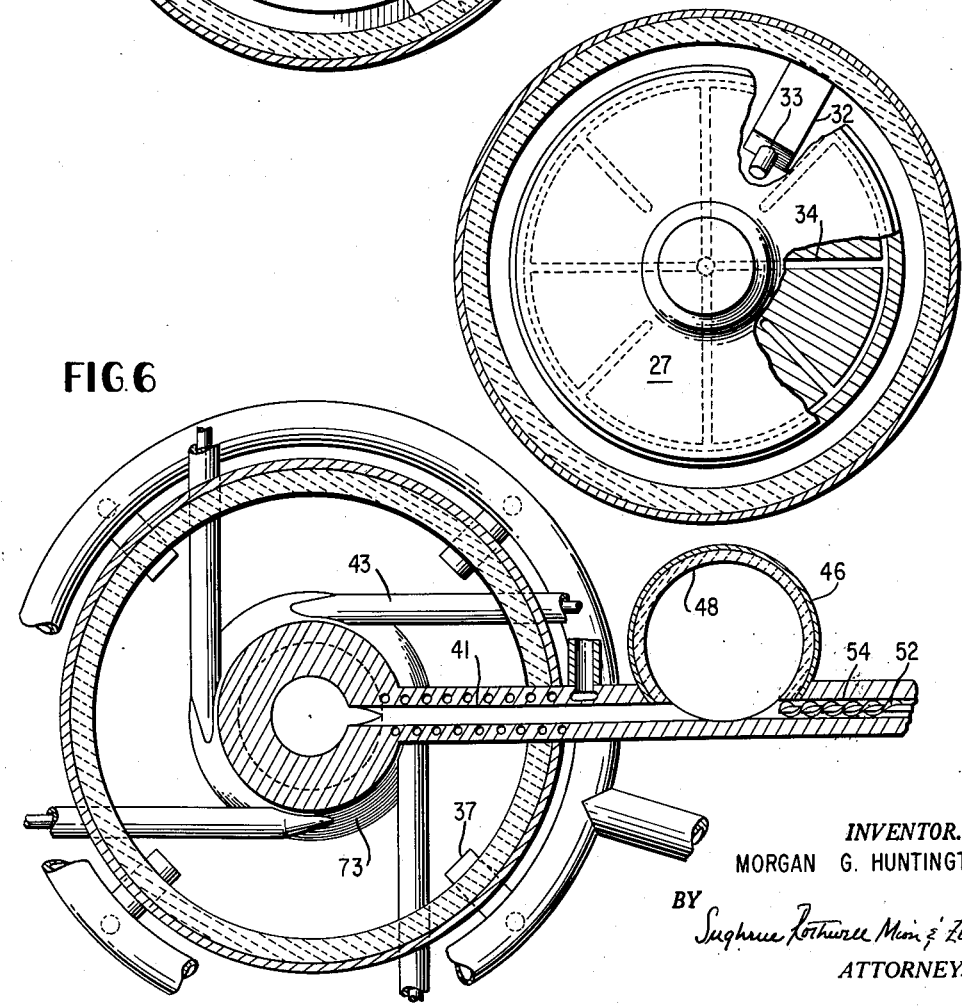

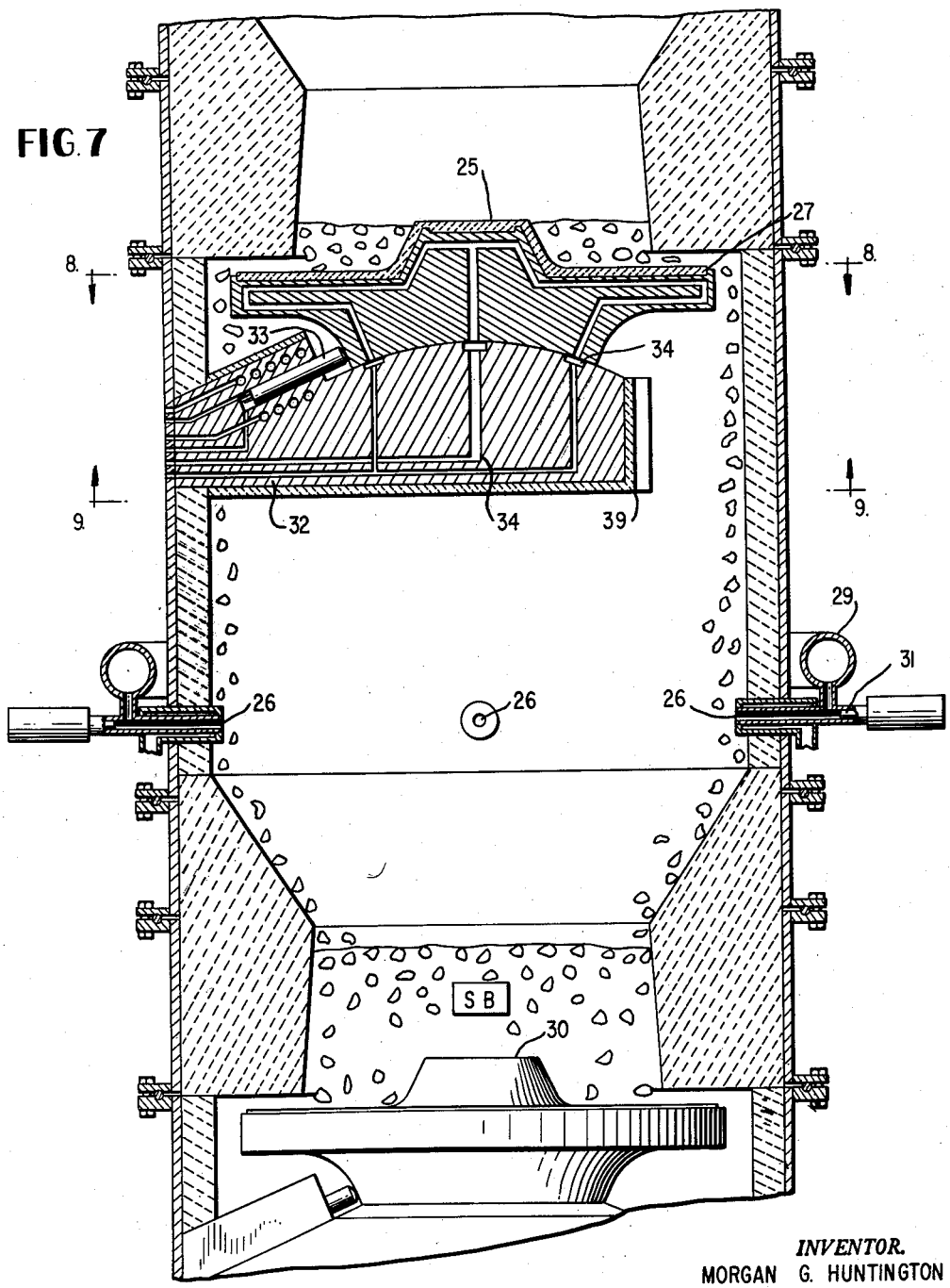

United States Patent Office

3,088,816
Patented May 7, 1963

---

3,088,816
METHOD AND APPARATUS FOR THE DRY ASH GENERATION OF HYDROGEN AND CARBON MONOXIDE GASES FROM SOLID FUELS
Morgan G. Huntington, Washington, D.C., assignor to Huntington Chemical Corporation, a corporation of Utah
Filed Dec. 9, 1960, Ser. No. 74,907
12 Claims. (Cl. 48—63)

This invention relates to continuous, pressurized, dry ash gasification of coal char, anthracite and other low volatile hydrocarbonaceous materials; and particularly relates to gasification of crushed, unsized carbonaceous material of high mineral content which may not be amenable to efficient gasification in slagging-type gasifiers nor to dry ash gasification in those systems which employ grates and/or perforated plates upon which gasification must proceed to completion within a single fuel bed and/or within a single chamber.

The gasification of coal and coke to generate carbon monoxide and hydrogen, which are together usually called synthesis gas, has been practiced in Europe for many years in order to provide a materials source for the synthesis of petroleum-like products as well as for synthesis of ammonia, alcohols, urea, formaldehyde and other compounds leading to the production of plastics and other synthetic chemical products.

The gasification of low grade solid fuels on an economically practicable scale has never been practiced in the U.S.A. In order to economically gasify many low grade carbonaceous materials such as coal mine wastes, a successful system must necessarily provide a very high material throughput capacity per dollar of investment and, at the same time, it must efficiently convert substantially all the combustibles into useful product gases.

The known continuous gasification systems which have been developed for the generation of synthesis gas from solid fuels involve the complete gasification of the fuel within a single fuel bed and/or within a single chamber. Also, such dry ash systems employ industrial oxygen with the necessary coincidental injection of three to four volumes of steam in order to limit the fuel bed temperatures. Such continuous gasification systems generate a synthesis gas inferior in many respects to the blue water gas which was familiar in America earlier in this century.

The known synthesis gas producer systems all require a special kind and size of fuel and all of the systems so far practiced commercially fail to operate uniformly and at highest production rates when an unsized, unsorted fuel is charged. It is an object of this invention to provide a method for the continuous gasification of unsized, crushed solid fuels without the necessity of fine grinding or of screening and wasting any part of the total as rejected and wasted fines, and wherein very coarse material or occasionally formed chunks of agglomerated fuel and/or ash will not interrupt the operation of the gasification system even though a large portion of the fuel charged might be in pulverant form.

In the known continuous fixed bed and fluidized bed solid fuel gasification systems now commercially practiced, gas production is limited to the rate at which oxygen and steam can be uniformly blown through a single fuel bed. Over-blowing in such systems or the inadvertent formation of agglomerate results in the channeling of fluids through the fuel thereby creating further unsatisfactory gas-solid contact conditions with a resulting poorer gas quality and especially a higher carbon dioxide and undisassociated steam content, plus an over-all lowered efficiency of the solid fuel gasification process. It is a further object of this system to provide a method of solid fuels gasification wherein channeling of the fuel is impossible even at extraordinarily high production rates and in spite of the occasional agglomeration of fuel and/or ash.

In the known continuous solid fuels gasification apparatus so far commercially developed, gas generation must be completed within a single fuel bed and at a certain horizon and/or within a single chamber. Any increase in fuel charging rate beyond the optimum gasification capacity of the unit inevitably results in the incomplete utilization of the solid fuels and in a proportionate increase in the unburned fuel content of the ash discharged or carried over. It is a further object of this invention to provide a means of gasifying solid fuels whereby partial gasification of the fuel proceeds simultaneously and under optimum conditions within a plurality of separated and superimposed moving fuel beds and/or chambers, and whereby complete gasification of the solid fuel may be insured under all conditions even though the charging rate of the fuel to the system might be rapidly varied over a considerable range.

The previously practiced continuous gas producer systems inject oxygen and steam simultaneously into the fuel bed to effect gasification, and the initial product of gasification in the fuel bed is almost entirely carbon dioxide, as will be illustrated hereinafter. The formation of carbon monoxide in such fuel beds is, therefore, principally a function of the secondary reduction of carbon dioxide to carbon monoxide and of the decomposition of steam both of which strongly endothermic reactions are dependent upon sufficient time of contact with incandescent carbon at proper temperature.

That effective gas-solid contact at optimum temperature is not achievable in commercial dry ash gas producers so far demonstrated is evidenced by the fact that both the pressurized and fluidized bed systems almost always generate a product gas which is 25 percent or more carbon dioxide by volume and containing an equal or greater volume of undisassociated steam in the product gas. Such high carbon dioxide and water vapor content in the product gas indicates a very low fuel bed reaction temperature with the resulting poor conversion of carbon dioxide to carbon monoxide and a very poor disassociation of steam into hydrogen and carbon monoxide within the upper part of the fuel bed. Such incomplete conversion of both carbon dioxide and steam to the desired hydrogen and carbon monoxide is wasteful of both fuel and steam and such inefficiency resulting from too low reaction temperatures in the upper fuel bed nearly doubles the amount of raw materials required to produce a given volume of synthesis gas consisting wholly of carbon monoxide and hydrogen. It is, therefore, an object of this invention to provide principal gas generating beds which are maintained at optimum reaction temperatures through continuously feeding fuel heated to optimum temperature to the top of the gasification beds so that the upper section of each such bed is maintained at a higher temperature than its bottom.

When oxygen and steam are injected together into a fuel bed or into a single chamber as is the case in the presently practiced gas producing systems, the oxygen is entirely consumed in the formation of carbon dioxide in passing through the first few inches of fuel bed and maximum fuel temperatures exist at this lowest bed horizon. Almost no carbon monoxide is formed until practically all of the oxygen has disappeared and until the carbon dioxide content has reached a maximum. After the oxygen has disappeared from the blasting gas, the formation of carbon monoxide from carbon dioxide is rapid provided that sufficient gas-solids contact time is afforded at an adequate fuel temperature level.

The steam injected into the fuel bed with oxygen in such gasification processes, passes through the hottest part of the fuel bed unchanged and the decomposition of steam, like carbon dioxide, does not begin to any appreciable extent until all of the oxygen has disappeared from the blasting gas. The decomposition of the steam to hydrogen and carbon monoxide on incandescent carbon must therefore compete with the decomposition of carbon dioxide to carbon monoxide for the heat available in the upper and always cooler section of the normal gasifier fuel bed. Therefore, neither the decomposition of carbon dioxide nor of water vapor can proceed to completion under optimum conditions because of the additional factor that the incoming descending fuel also requires preheating from the same sensible heat source of the ascending gases and all three competing heat requirements of conventional systems must be met from the one heat source. It is therefore an object of the system of this invention to separate the functions of fuel preheating, combustion and the gasification of solid fuel into hydrogen and carbon monoxide by continuously performing these three different functions in three separate, superimposed zones.

In fixed bed and fluidized bed gasifiers the fuel gasification rates are in the order of one to three hundred pounds of fuel gasified per hour per square foot of horizontal fuel bed area. Any increase in blowing rate and/or fuel charging rate inevitably results in unsatisfactory fuel bed conditions with a lower quality of producer gas, and, in respect to the fluidized and pressurized fixed bed types, any departure from the optimum fuel bed conditions inevitably results in unburned fuel leaving the system. It is a further objective of this system to increase the efficient solid fuel gasification rate by a factor of five to ten-fold for a given diameter of gasifier apparatus through simultaneously effecting partial gasification of descending, and cascading solid fuels within a number of separated, superimposed fuel reaction zones, each of which is served by a separate fluid handling system.

The advantages of operating a solid fuels gasification system under pressure are well known. Because the pressure drop through beds of broken solids decreases directly as the ratio of compression, the over-all dimensions of the gas producer and piping can be proportionately smaller. On the basis of pressure drop alone, the capacity of such a pressurized fuel bed gasification capacity of such pressurized fuel bed should be directly proportionate to the compression. However, because of the decrease in terminal velocity of settling fine material against compressed and heated fluids, the actual capacity increase for a pressurized gas producer is approximately proportional to the square root of the compression ratio.

The effect of pressure upon the gasification reactions is important. By compressing from one atmosphere to twenty atmospheres, as is common practice in the Lurgi fixed bed pressurized gasification system, both the water gas reaction equilibrium temperature and the equilibrium temperatures of the carbon dioxide to carbon monoxide reaction increase approximately 400° F.

It is this effect of pressurization, increasing the equilibrium temperature of the gasification reactions, which imposes a sharp limitation upon the quality and character of the gas which can be produced in a dry ash, fixed bed rotating grate solid fuels gas producer such as the Lurgi type. Rotating grates simply will not withstand such a temperature increase and, because of metallurgical temperature limitations and particularly because of ash fusion propensities, such pressurized systems must inject with the oxygen, diluents such as steam and/or other gases. Therefore, the reacting fuel bed is necessarily several hundred degrees below the optimum temperatures at which practically complete disassociation of water vapor and carbon dioxide could be achieved. If it is desired to carry out the requisite reactions at high temperatures and pressures, the metallurgical limit of grates of the known apparatus would be exceeded and/or the fuel ash would fuse and agglomerate. Therefore, this invention provides a novel type of combustion including oxidizing or burning the fuel in two stages without the injection of a fluid diluent with the oxygen while the fuel is moving in a zone of turbulence.

In view of the foregoing it is, therefore, a particular object of this invention to provide a means of maintaining upper gasification fuel bed temperatures at or above the optimum equilibrium temperature at which practically complete disassociation of both water vapor and carbon dioxide will be obtained. At the same time, without the simultaneous injection of steam or other diluent with oxygen, the system of this invention provides a means whereby ash fusion is avoided and whereby dry ash conditions can be maintained even at considerably elevated gasification reaction temperatures.

This invention also contemplates a solid fuels gasification process in which controlled, continuous, dry ash, partial combustion of the descending solid fuel is repeated in alternate zones and whereby the descending solid fuel is repeatedly and continuously heated to a precisely predictable temperature solely by the controlled injection of oxygen in "continuous blow-run zones" in order that the continuous "water-gas make zones" immediately below each blow-run may be held at predictable temperatures and whereby the top of the fuel bed of each "gas-make zone" is always hotter than its bottom.

This invention also provides a process in which blow-run gas leaving each continuously operated blow-run zone consists almost entirely of carbon dioxide and in which the carbon monoxide content is reduced to a minimum before exiting from each blow-run zone, and, where industrial oxygen is used for combustion, the sensible heat of the blow-run gas plus its calorific value is estimated to be less than 25 percent of the total heat of the reaction $C + O_2 = CO_2$.

Other objects of the invention will be pointed out in the following description and claims and illustrated in the accompanying drawings which disclose by way of example, the principle of the invention and the best mode which has been contemplated of applying that principle.

In the drawings:

FIG. 5 is a side elevation partially in section illustrating a portion of the apparatus adapted for carrying out a unique method of partial combustion utilizing dual injection of oxygen in a blow-run zone.

FIG. 6 is a sectional view along line 6—6 of FIG. 5.

FIG. 7 is a side elevation view of another portion of the apparatus with gyratory shelf shown in section illustrating coolant passages.

FIG. 8 is a sectional plan view taken along line 8—8 of FIG. 7.

FIG. 9 is a sectional plan view taken along line 9—9 of FIG. 7.

In order to fully explain the present invention it is necessary to first consider the principal chemical reactions involved in gasifying solid fuels with oxygen and steam. These principal twelve reactions are shown on FIG. 2 and listed below:

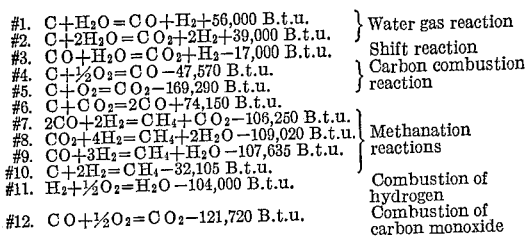

| | | |
|---|---|---|
| #1. $C+H_2O=CO+H_2+56,000$ B.t.u. | } | Water gas reaction |
| #2. $C+2H_2O=CO_2+2H_2+39,000$ B.t.u. | | |
| #3. $CO+H_2O=CO_2+H_2-17,000$ B.t.u. | | Shift reaction |
| #4. $C+\frac{1}{2}O_2=CO-47,570$ B.t.u. | } | Carbon combustion reaction |
| #5. $C+O_2=CO_2-169,290$ B.t.u. | | |
| #6. $C+CO_2=2CO+74,150$ B.t.u. | | |
| #7. $2CO+2H_2=CH_4+CO_2-106,250$ B.t.u. | } | Methanation reactions |
| #8. $CO_2+4H_2=CH_4+2H_2O-109,020$ B.t.u. | | |
| #9. $CO+3H_2=CH_4+H_2O-107,635$ B.t.u. | | |
| #10. $C+2H_2=CH_4-32,105$ B.t.u. | | |
| #11. $H_2+\frac{1}{2}O_2=H_2O-104,000$ B.t.u. | | Combustion of hydrogen |
| #12. $CO+\frac{1}{2}O_2=CO_2-121,720$ B.t.u. | | Combustion of carbon monoxide |

*Note.*—In keeping with thermodynamic convention, heat liberated by a reaction is designated by a minus sign, and is on a pound mol basis. In reactions involving $H_2O$, steam enters the system somewhat above saturation temperature.

Figure 2:
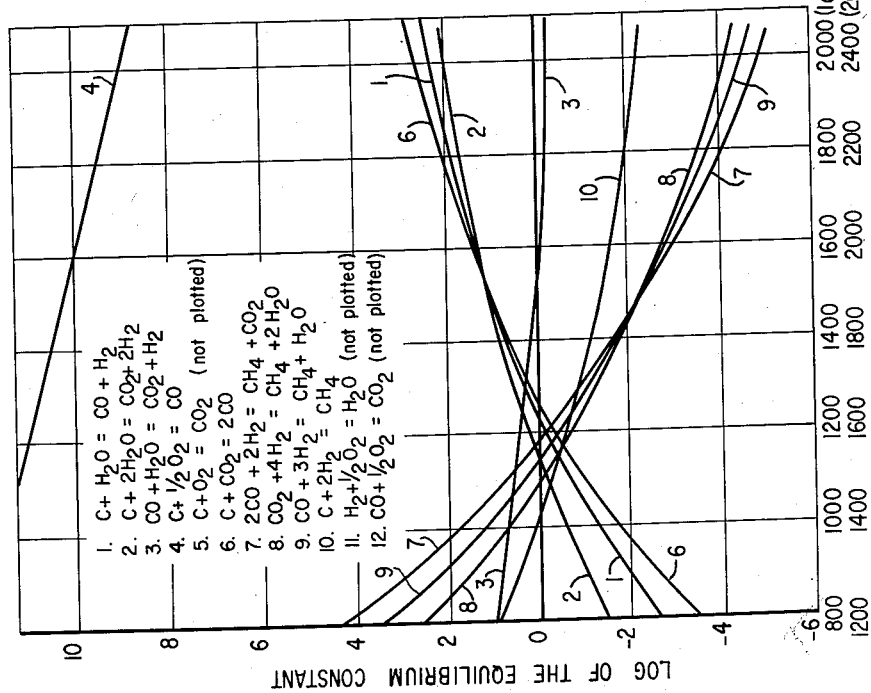
FIG. 2 is a graph of the carbon, hydrogen, oxygen reactions accompanying the gasification of solid hydrocarbonaceous materials with the log of the equilibrium constant plotted as a function of temperature.

The above listed reactions are plotted in FIG. 2 with the log of the equilibrium constant as a function of temperature at both one atmosphere and 20 atmospheres pressure. The reactions have been numbered for the sake of simplicity and will be referred to by these numbers hereinafter.

Reactions #1 and #2

$$(C+H_2O=CO+H_2 \text{ and } C+2H_2O=CO_2+2H_2)$$

are the well known steam-carbon reactions which occur at a high rate at temperatures above 1652° F. at atmospheric pressure, the rate of Reaction #1 decreasing more rapidly than Reaction #2 as the temperature falls below this level as shown in FIG. 2. The use of pressure in conducting these two reactions is not helpful. In fact, at 20 atmospheres' pressure, to obtain the same equilibrium constant for Reactions #1 and #2 the temperature must be increased approximately 400° F. over the required temperature at atmospheric pressure as shown by a comparison of the scales on FIG. 2.

Of course, Reaction #1 represents the results usually sought in preference to those of Reaction #2. This is because of the fact that, although the heat requirements in promoting Reactions #1 and #2 are of the same order of magnitude and nearly the same, and the amount of combustible gas is the same in each case, the mixed gases of carbon dioxide plus hydrogen produced according to Reaction #2 are one-third by volume, non-combustible carbon dioxide, and that twice as much steam is reacted in Reaction #2 as in Reaction #1 per unit volume of combustible gas made. Hence the duration of the gas generating period of the ordinary water gas cycle in the intermittent system is commonly selected so that only a relatively small amount of Reaction #2 occurs. However, because pressurized, rotating grate gasifiers such as the Lurgi cannot reach the minimum equilibrium temperature of about 2000° F. in the upper fuel bed without ash fusion in the lower section of the fuel bed and possible grate destruction, Reaction #2 necessarily prevails.

The analysis of a typical blue water gas and its blow-run gas made at one atmosphere pressure from coke by methods in common use in the United States before the advent and general availability of natural gas is set out below, and the possible analysis of the water gas generated by the dry ash, pressurized apparatus of this invention is compared thereto.

MAKE GAS

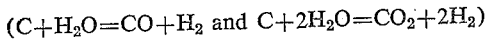

| | Typical Intermittent Water Gas Analysis, percent | This System Continuous Blue Water Gas Analysis, percent |
|---|---|---|
| Carbon Dioxide | 4.3 | 1.0 |
| Illuminants | 0.1 | nil |
| Carbon Monoxide | 41.3 | 48.2 |
| Hydrogen | 49.2 | 49.6 |
| Methane | 0.8 | 0.2 |
| Nitrogen | 4.3 | 1.0 |
| $H_2+CO$ Volume percent of raw gas | 90.5 | 97.8 |

BLOW GAS

| Intermittent Water Gas System | This System |
|---|---|
| Average CO content, 20 percent of the total calorific value of the fuel charged. | CO content—nil. |

Not only is the system of this invention at least 40 percent more efficient than the intermittent system (75 percent cold thermal efficiency against 55 percent for the intermittent system), but special, expensive fuel is not required.

For the process of generating hydrogen and carbon monoxide (synthesis gas) to be made continuous, it is necessary to supply the heat of reaction to the fuel bed during the gas making period. The common practical method of doing this in prior known continuous systems is to introduce oxygen along with the steam. The amount of oxygen required is of particular importance not only because it is expensive but because, in all previously developed systems, its use alters the composition of the gas made. However, the use of oxygen does not affect the gas analysis in the case of the present invention, because combustion with oxygen takes place in a zone separate from the gas making zone.

The exothermic Reactions #4 and #5 ($C+\frac{1}{2}O_2=CO$ and $C+O_2=CO_2$) define the oxidation of carbon and the amounts of heat evolved as tabulated above. In generating producer gas, it would be desirable in one sense only if the oxygen employed were consumed by Reaction #5 ($C+O_2=CO_2$) because more heat is evolved per mole of carbon dioxide and less oxygen is required per unit of heat energy involved. (This is exactly what occurs in the continuous blow-run of this invention as will be later described.) However, at high temperatures in the presence of carbon, Reaction #4 ($C+\frac{1}{2}O_2=CO$) will predominate, or to be more exact, Reaction #6 ($C+CO_2=2CO$) occurs whereby the carbon dioxide evolved by Reaction #5 combines with additional carbon to form carbon monoxide.

At usual gas making temperatures, all of these reactions, #4, #5 and #6, will occur when oxygen is introduced into an ignited fuel bed and the net result will be the generation of heat amounting to a minimum of 47,570 B.t.u. per mole of carbon oxidized by oxygen. The heat actually generated will be between 47,570 and 160,290 B.t.u. per mole, depending upon the depth of fuel bed, its temperature and the rate of blowing.

For the purpose of economy it is usually desirable to make gas by employing high rates of flow of the gas-making fluids in the generator. However, in all dry ash gasifiers, except the subject system, it is necessary to maintain moderate temperatures in the fuel bed because of low softening temperatures of the fuel ash. Under these conditions, reaction rates in the generators are necessarily low, whether or not a state of equilibrium is actually attained. Under such low temperature conditions, the reactivity of the fuel is an important factor governing the rate and degree of completeness of the reactions and the composition of the gas made. A study of the basic gas reactions listed above with references to these variables is necessary in understanding the reasons for certain operations employed in the process of this invention described hereinafter.

At present there are two fundamentally different approaches to the gasification of solid carbonaceous fuels, the oxygen producer gas method and the intermittent blue water gas method. The method in more general use is the oxygen producer gas method which combines steam with oxygen in the fuel bed blast. Typifying such oxygen producer gas systems are the slagging type gas producer, the fluidized-bed producer, the pressurized Lurgi system and the fully entrained systems developed by the Bureau of Mines, all mentioned above.

Because air and steam are mixed in the fuel bed blast, the best possible product gas analysis obtainable in any of these oxygen producer gas systems is that of the slagging type producer gas system and this is about as follows:

| | Percent by volume |
|---|---|
| $CO_2$ | 3.5 |
| $CH_4$ | 1.0 |
| $H_2$ | 28.0 |
| $CO$ | 66.5 |
| $N_2$ (principally from fuel) | 1.0 |
| | 100 |

It will be noted that the hydrogen and carbon monoxide combined constitute 94.5 percent by volume of the product gas in this type of producer gas system but that the hydrogen volume is less than half that of carbon monoxide. Also the above gas analysis is actually attainable only because of the higher fuel temperatures in the slagging type gas producer. However, both the fixed bed and fully entrained ash slagging systems have a relatively high investment cost per unit of gas produced.

In both the fluidized-bed and the Lurgi systems, the average carbon dioxide content of the product gas is somewhat greater than 25 percent due to the fact that at the lower temperature of the upper fuel bed, the Reaction #6 listed above can not go to completion and therefore a considerable amount of the original $CO_2$ first produced by reaction #5 remains unreduced to CO. Also at the imposed lower fuel bed temperatures, Reaction #2 between carbon and steam predominate and is more likely to occur with the generation of more carbon dioxide but with an equal production of hydrogen. Further, some one-quarter of the volume of the product gas in the two dry ash systems is unreacted steam, which constitutes a major inefficiency.

The second general type of gas generating system is typified by the familiar, intermittent blue water gas process. In that system, heat for the endothermic reactions involved in the disassociation of steam is supplied to the fuel bed by blasting it with air during the "blow-run." Upon raising the fuel bed (usually furnace size coke or anthracite) to a suitable temperature and before the carbon monoxide content of the blow-run gas has become excessive, the "blow-run" is interrupted and the hot fuel bed is subsequently blasted with steam for the gas "make-run" until the temperature has dropped to a point where the product blue water gas has too high a carbon dioxide content, whereupon the "blow-run" is repeated.

The fundamental differences between the "producer gas" and the "water gas" approach to the gasification of solid fuels are discussed below as necessary to an understanding of the continuous water gas approach of this invention.

Figure 4:
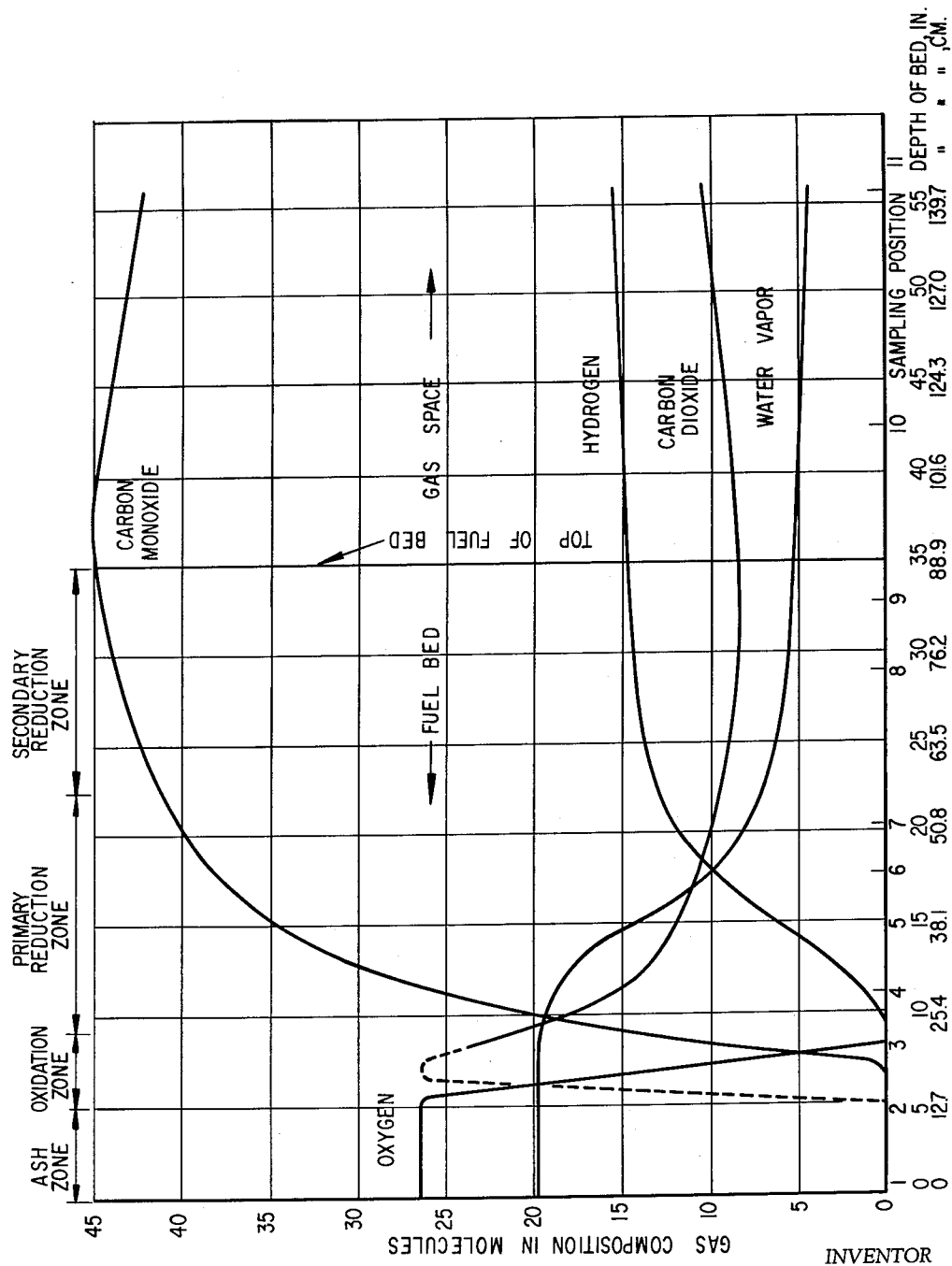
FIG. 4 is a graphical showing of the gasification reactions occurring in an air blown gas producer fuel bed with the depth of the bed plotted as a function of the gas composition.

FIG. 4 plots the composition of gas produced as a function of fuel bed depth above the grate in a typical producer gas fuel bed. From FIG. 4 it is evident that in the lowest part of the bed only Reaction #5

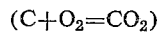

$$(C+O_2=CO_2)$$

occurs. Also it may be seen that immediately above this lowest part of the fuel bed and following the complete disappearance of oxygen, both the decomposition of carbon dioxide, Reaction #6, and the decomposition of steam, Reaction #1 proceed. At lower temperatures (below 1600° F. at one atmosphere), Reaction #2 must also compete for the sensible heat in the upper and much cooler part of the fuel bed. The sensible heat of the ascending gases must in addition, supply the further requirement of heating the descending, cold incoming fuel.

Figure 3:
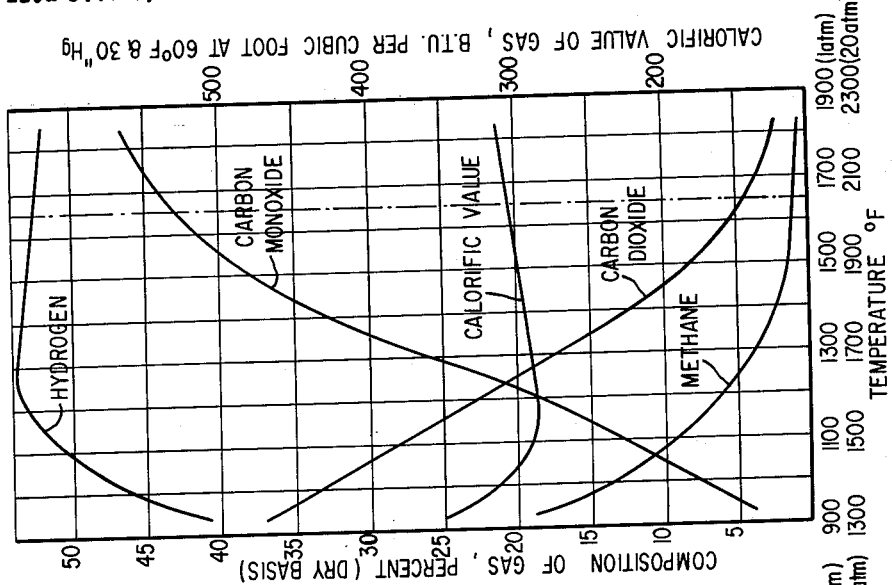
FIG. 3 is a graphical showing of various curves with the composition of gas plotted as a function of temperature and the calorific value of the gas plotted as a function of temperature for various gases.

FIG. 3 plots the equilibrium composition of water gas as a function of fuel bed temperatures at atmospheric pressure and at 20 atmospheres' pressure. In comparing FIG. 4 and FIG. 3 it will become evident that the water gas approach to the gasification of solid fuels, which becomes a continuous method in this invention, separates the functions of combustion (Reaction #5) and the decomposition of water on incandescent carbon (Reaction #1). In the continuous water gas system of this invention, only one type of reaction is proceeding within any single fuel bed at any one time because combustion zones are separated from gas-make zones and both the combustion and water gas reactions proceed separately and under optimum conditions for highest efficiency and highest materials throughput rates.

It should also be noted that, in this continuous water gas system, the tops of the gas-make fuel beds are always hotter than the lower sections and because the incoming fuel to the make-bed is at its maximum temperature as it leaves a combustion zone above, and there is no problem of preheating the incoming fuel in competition for heat with the gas-making reactions. Also, the continuous heating of the fuel bed (blow-run) proceeds simultaneously but separately from the continuous decomposition of steam on incandescent carbon (make-run) and at optimum temperature and under such conditions, which are explained below, that practically all CO is burned to $CO_2$ within the combustion chamber, and, therefore, the carbon monoxide content of the blow-run flue gas is negligible. Coincidentally, because of the optimum temperature of the "gas-make" fuel bed, Reaction #1 proceeds at high speed to the practical exclusions of Reactions #2, #7, #8, #9 and #10 and the carbon dioxide and methane content of the make-gas is minimal. However, when a "Lurgi type" fuel gas of high methane content is desired, suitable controls are available to alter the steam flow direction and fuel bed temperature in order to favor the methanation reactions.

Figure 1:
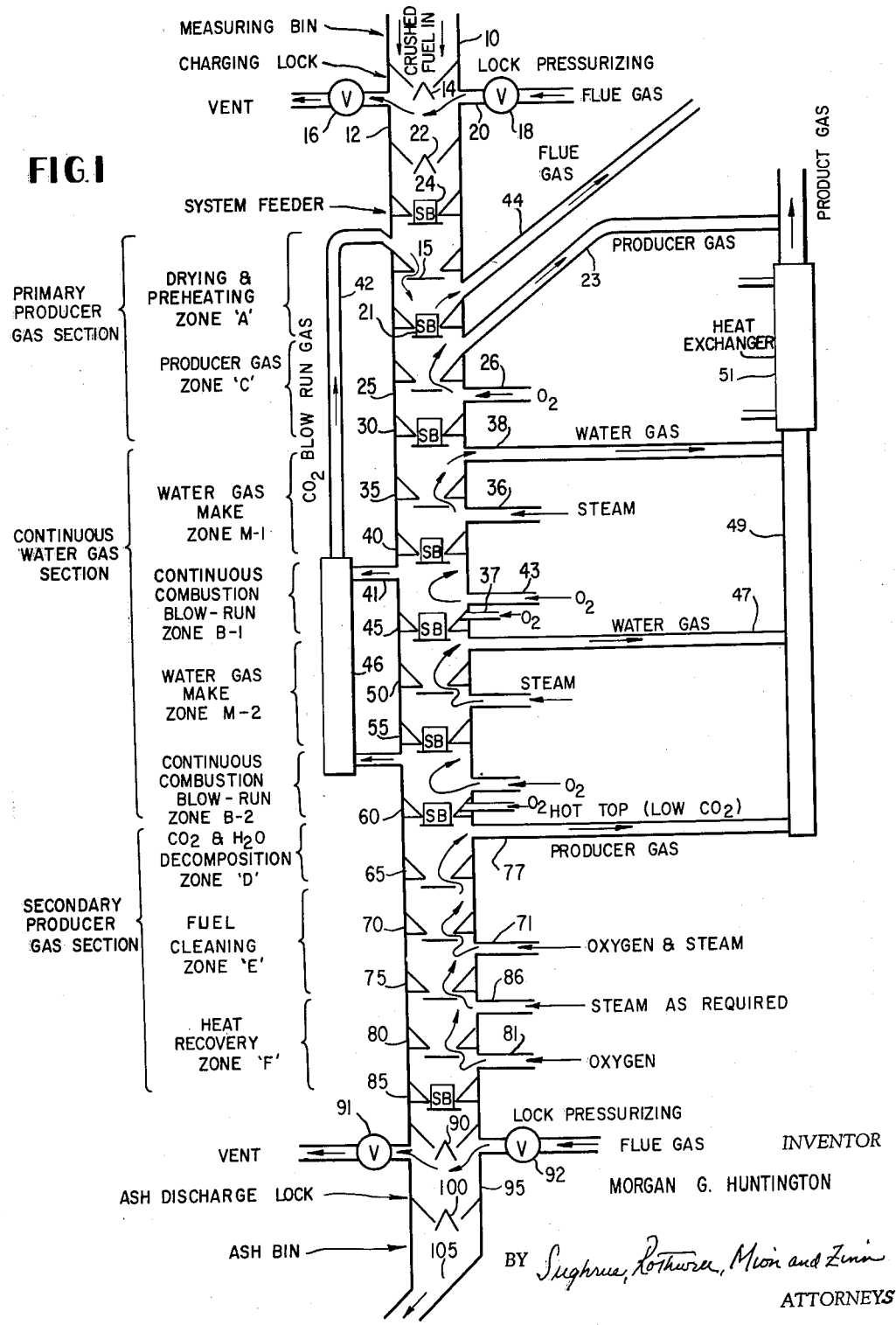
FIG. 1 is a schematic illustration of the flow of fluids and solids during the practicing of this invention in its preferred embodiment.

Referring to FIG. 1, this schematic drawing illustrates the continuous blue water gas system which is capable of carrying out a preferred embodiment of the process of this invention. Most of the specific mechanical components and controls therefor, contained within the continuous blue water gas system, are functionally similar to those shown in my co-pending application Serial No. 17,293 (Series of 1960) filed March 24, 1960. However, details of gyrating shelves suitable for use in combustion zones, unique oxygen and steam injection tuyeres, and fluid off-takes are described in this application.

In general, this dry ash, solid fuels gasification system includes a single, continuous, pressurized vessel having means for measuring and charging solid fuels thereinto and discharge means of removing ash therefrom together with means for continuously feeding solids in a controlled manner with annular cascades on to successive shelves with means for introducing and withdrawing gases and other fluids at selected points in the vessel within chambers defined by deep separating beds of solids. This system accomplishes drying and preheating of the incoming fuel to a temperature below 700° F. by concurrently circulating hot flue gas and then further heating the solid fuel to optimum water gas reaction temperature by partial combustion through controlled injection of oxygen, then injecting steam for the production and separate withdrawal of water gas, and final gleaning of fuel from the ash and recovering the sensible heat therefrom.

Within the single, pressurized, continuous vertical vessel, a number of functions are continuously, simultaneously, and separately performed. Two of these functions are repeated a desired number of times. These several functional zones are shown in FIG. 1 and are described below.

Zone A is a fuel preheating and drying section, followed by a primary gas producer Zone C in which the gaseous products from this primary gas producer zone contain all of the volatile matter from the fuel. Partial combustion by the controlled injection of oxygen in this primary gas producer Zone C heats the descending fuel sufficiently to furnish sufficient sensible heat for the partial, continuous water gas reaction of a first blue water gas-make zone, Zone M-1, immediately therebelow.

Zones M-1, M-2 are the continuous gas-make zones, into which steam sufficient for the gas reaction, is injected through the descending moving beds of incandescent solid carbon. Heat for the water gas reaction at optimum temperature is furnished by partial combustion in each continuour blow-run zone immediately above. It is important to note that each gas-make fuel bed maintains its maximum, uniform temperature at the top of the bed and its minimum temperature at the bottom of the fuel bed. This is the reverse temperature gradient of any known fuel bed subject to such gasification reactions. Such a temperature inversion insures maximum decomposition of steam on incandescent carbon with a minimum of residence time provided the injection of steam is regulated according to the temperature and amount of incoming fuel.

Zones B-1, B-2 are continuous blow-run zones in which the descending annular cascade of solid fuel leaving the make zones M-1 and M-2, is reheated to the desired temperature of incandescence by partial combustion of the solid fuel. The temperature of the descending fuel in the blow-run zones is a function of the rate of oxygen in-flow proportioned to the solid fuel flow and no steam or other dilutent is injected with the oxygen.

Zone D is a carbon dioxide and steam decomposition zone. That is, Zone D is not gas separated from the next lower Zone E wherein producer gas is generated. However, the hot solid fuel fed to Zone E from the next higher Zone B-2 will react with carbon dioxide and undissasociated steam in the producer gas prior to the producer gas passing through an off-take from the system.

Zone E performs the fuel clean-up function and in this zone the last of the combustibles are removed from the ash. At what specific horizon within the continuous, pressurized vessel, the last of the fuel disappears from the ash is immaterial to the efficient operation of this system.

In Zone F, oxygen is injected near the bottom of the vertical vessel and flows countercurrently through the falling ash. As long as no combustibles are encountered, the lowest section of the column serves solely a heat recovery function and the sensible heat of the ash is largely transferred to counter-flowing oxygen. As fragments of unburned fuel are encountered in the descending ash, the rise in temperature may be controlled by injection of steam with the oxygen, and so Zone F may therefore assume the function of Zone E. The boundary between Zones E and F is one of function only.

Thus, in effect, the column of descending and cascading solid fuel can be functionally divided into three sections illustrated by brackets in FIG. 1. The top section includes Zones A and C and is designated as the primary gas producer section in which flue gas furnishes heat for drying and preheating the incoming fuel and oxygen is injected for raising the temperature of the fuel to gas reaction temperatures.

The central section is comprised of alternate, continuous blow-run and gas-make Zones M-1, M-2, B-1, B-2, and is therefore a continuous water gas generator section.

The third and lowest section, consisting of Zones D, E, and F, serve to remove the last of the combustibles from the descending dry ash and recover some of its sensible heat, therefore Zone E also functions as a gas producer section in that both oxygen and steam are injected.

Each of the zones within the vertical column contains one or more gyratory shelf peripheral feeders with heavily insulated and liquid-cooled mechanisms as shown in FIGS. 7, 8, and 9. The nature of these gyratory peripheral feeder mechanisms is disclosed in my aforesaid co-pending application Serial No. 17,293 (Series of 1960), filed March 24, 1960, and reference may be had thereto for a further description of the details of the mechanical features of the gyratory shelf, the principles of its gyratory movement and materials feeding, as well as the means for control thereof.

At the top of the vertical, cylindrical retort shaft indicated in FIG. 1 is a measuring bin 10 which is charged with just enough raw, crushed, solid fuel so that its entire contents may be dumped into charging lock 12, while leaving bell valve 14 completely clear for unobstructed closing. After the raw coal or solid fuel is dumped into the charging lock 12 and the bell valve 14 is closed, the charging lock may be pressurized and brought to system pressure by closing vent valve 16 and opening inlet valve 18 allowing non-explosive flue gas to flow from a reservoir (not shown) into the charging lock 12 through conduit 20 at system pressure.

In the pressurizing of charging lock 12 with flue gas, the purpose is not only to use a gas more readily available and cheaper than steam but the flue gas will also be entirely non-explosive since it contains principally products of combustion produced as waste from the system.

This will also be true in pressurizing the ash discharge lock and is perhaps more important from the standpoint of safety and to provide insurance against an inadvertent explosion. If, for example, the ash discharge lock were pressurized with steam and if some of the ash were not completely impoverished of solid combustible fuels, hydrogen would be immediately generated and upon mixing with air, a highly explosive situation would result. Therefore both the charging and the discharge locks are pressurized with the relatively inert flue gas in order to eliminate absolutely any possibility of an explosion due to the mixing of outside air with combustible gases.

Upon attaining system pressure in charging lock 12, bell valve 22 at the bottom thereof may be opened so that the crushed coal or solid fuels from charging lock 12 is dumped upon gyratory shelf feeder 24 which is the system feeder. After the solid fuel has descended below the level of bell valve 22, the charging lock 12 may be depressurized after closing bell valve 22 and flue gas valve 18 and by opening vent valve 16, in that order, and then venting the lock pressurizing gas into the atmosphere. The charging lock may then be reloaded as before by opening bell valve 14.

Below gyratory shelf system feeder 24 are a number of other vertically spaced gyratory shelves 15, 21, 30, 35, 40, 45, 50, 55, 60, 65, 70, 75, 80 and 85 all mechanically substantially similar. The rate at which the crushed solid fuel is fed off any of these gyratory shelf peripheral feeder units is a function of the amplitude and rate of gyration of each gyratory shelf. These gyratory shelf peripheral feeder units are automatically controlled in a manner set out in my aforesaid co-pending application, Serial No. 17,293. With such automatic control responding as a function of the fluid pressure drop through individual fuel beds, the amount of solid fuel on any selected shelf may be kept sufficiently deep to prevent substantial gas flow from above and below the shelves thereby functioning as a deep, separating bed, designated SB.

Further, referring to FIG. 1, crushed solid fuel, preferably of the low volatile type, is fed off the periphery system feeder shelf 24 and enters a drying and preheating Zone A. Zone A incorporates a flue gas heat exchanger with concurrent flow of the solid fuel on shelf 15 and out through flue gas stack 44. A separating bed SB on gyratory shelf 21 separates the fluid flow between Zones A and C. Zone C is a gas producer and includes gyratory shelf 25.

Following the drying and preheating of the fuel to 600°–700° F. by the waste heat of the blow gas, the hot producer gas generated by the partial combustion of the cascading solid fuel by oxygen injected through tuyeres 26 further heats the incoming fuel to just below its ash fusion temperature. Neither steam nor carbon dioxide is introduced into the gas producer Zone C with the oxygen because the essential function of this zone is the heating of raw, crushed, solid fuel and such endothermic gas making reactions as #1, #2 and #6 could rob the ascending carbon monoxide of the sensible heat needed for heating the incoming fuel. The gas outlet from gas producer Zone C is connected through duct 23 to the product gas stream. The injection of oxygen into gas producer Zone C about midway between shelves 25 and 30 is limited to that amount which will generate sufficient heat to raise the temperature of the cascading fuel to just below its ash fusion point. In order to reduce the tuyere flame temperature in Zone C, product gas consisting only of hydrogen and carbon monoxide may be recycled (not shown). Because these gases do not react with the fuel, they serve only as thermal carriers to heat the incoming fuel. Recovery of the volatile matter from the usually low volatile fuel may also be effected in the gas producer Zone C. However, for the processing high volatile fuels, reference may be made to my co-pending patent application filed July 8, 1960, Serial No. 41,679 (Series of 1960). Also, for the processing of oil shale, see my co-pending application filed July 25, 1960, Serial No. 45,038 (Series of 1960).

A portion of the primary gas producer Zone C between shelf 25 and shelf 30 is illustrated in FIG. 7. The gyratory shelf mechanisms are similar to those illustrated and disclosed in my aforesaid co-pending application Serial No. 17,293, but are more heavily constructed, cooled, and insulated with castable refractory and refractory blocks in order to withstand the high temperature environment. The crushed, solid fuel is metered off of shelf 27 as an annular cascade, causing a turbulence of the hot carbon monoxide flowing downward with the fuel cascade and upward in the center of the chamber. Oxygen is introduced at a number of points at a horizon through injection tuyeres 26 from a bustle pipe or header 29. The tuyeres 26 are water jacketed and water cooled. The oxygen is injected radially at a number of points at low velocity to mix with the violently circulating carbon monoxide thereby limiting the intensity of the flame temperature somewhat below the ash fusion point. Were oxygen alone blown into a bed of stationary solid carbon, the temperature in front of the tuyeres could not be so limited without the addition of an outside diluent, i.e. the carbon monoxide functions as an autogenous diluent.

The low velocity of oxygen injection and the high turbulence within the chamber caused by the annular cascade of solid fuel effectively overcomes the tendency to locally overheat the fuel and to cause fusion of the ash and requires no simultaneous injection of steam or other diluent as is the case with other combustion methods. Because these oxygen tuyeres are necessarily low velocity injectors, mechanical punches 31 or other suitable tuyere cleaners are provided on each tuyere as shown. The oxygen injection contributes no significant kinetic energy to the turbulence of the system.

The gyratory shelf mechanism suitable for use in the high temperature environment is shown in section in FIG. 7. The gyrating shelf member 27 is preferably cast iron with a number of coolant passages therein. The surface of member 27 may be suitably insulated with castable refractory. The spherical concave lower bearing surface of member 27 is supported on a complementary convex spherical bearing surface of a stationary spider member 32. Spider 32 also contains coolant passages 34 matching with corresponding coolant passages in member 27, suitable widened area portions are provided on the mating surfaces of the spherical bearing to allow for the gyratory movement. A hydraulic piston 33 is mounted within a cylinder in each water cooled leg of the spider 32. By actuating each piston in sequence the member 27 partakes of a gyratory motion. Also the speed and amplitude of the piston strokes and hence the gyratory movement may be suitably controlled in response to sensed pressure drops across the bed or other suitable indicators as taught in my aforesaid application Serial No. 17,293. The spider 32 may also be constructed of cast iron covered with suitable castable refractory 39. All of the coolant, lubricating, and hydraulic passages may pass through the wall of the pressure vessel adjacent one or more of the legs of the spider. All of the other gyratory shelf units may be substantially identical to that shown in FIGS. 7, 8 and 9.

Referring again to FIG. 1, the deep separating bed 30 is now comprised of crushed solid fuel heated to a temperature just below the ash fusion temperature of the fuel. Gyrating shelf 30 in turn acts as a feeder as it meters off the incandescent fuel uniformly over its periphery to cascade into the continuous water gas-make Zone M-1. Within Zone M-1 are one or more gyrating shelves 35 which retain relatively shallow beds of heated solid fuel. Steam is injected into make Zone M-1 at injector 36 in sufficient quantity so that practically a complete disassociation of steam into hydrogen and carbon monoxide may be accomplished in contact with incandescent solid fuel. As is the case in the several water gas-make zones repeated below in the same single continuous vessel, the top of the fuel bed through which the steam and water gas exit remains at optimum water gas reaction temperatures and, because the fuel reaction bed is continuously fed from above by highly heated fuel, maximum disassociation of the steam can be effected for a given rate of steam injection. The water gas of make-zone M-1 exits through conduit 38 to join the output stream of low $CO_2$ synthesis gas.

The solid fuel then cascades down onto the deep separating bed on shelf 40 and after it reaches this bed may be reduced in temperature to somewhat below 1600° F., but not below the temperature necessary for ready ignition in oxygen.

The solid fuel is again reheated to just below the ash fusion temperature by partial combustion as it cascades from shelf 40 to shelf 45 through the continuous blow-run Zone B-1. It is noted that gyratory shelves 40 and 45 both carry deep separating beds thus isolating the blow-run zone from the gas in the rest of the column. This zone, as well as the other zones similarly separated, has its own fluid handling system.

Reference may be had to FIGS. 5 and 6 for an explanation of the partial combustion of the cascading fuel in blow-run Zone B-1 and succeeding blow-run zones.

The multiple gyratory feeder shelves such as 40 and 45 which retain moving beds of broken solids superimposed one upon another provide a series of separate chambers into which and through which there is a continuous annular cascade of the broken solid fuel. The effect of this annular cascade of solid fuel is to create a severe turbulence within each reaction chamber generated by the kinetic energy of the falling solids. Thereby, intimate gas-solid contact is forced between the cascading solids and the gases occupying the reaction chamber and therefore, heat transfer by conduction from gases to solids and/or solids to gases is rapid.

The turbulence created by the cascading fuel within each reaction chamber provides an unusual but convenient means of achieving partial combustion of the solid fuel in oxygen without raising the surface temperature of the fuel so that ash fusion becomes an important factor. Oxygen in limited amount is radially injected at low velocity so as to impart no significant kinetic energy to the system, through a number of water cooled tuyeres 37 against the outside of the annular cascade of solid fuel particles. Because the fuel fragments are falling rapidly across the tuyere noses and also because of the violent circulation of carbon monoxide within the chamber, no localized combustion hot spot can exist. Dilution of the oxygen is effective by this carbon monoxide and no added diluent such as steam or other gases need be injected with the oxygen to hold the particle surface combustion temperature below its ash fusion point.

The effective reaction between carbon and oxygen under the circumstances described above is to achieve combustion to carbon monoxide with the liberation of about 28 percent of the total heat or 47,570 out of 169,290 B.t.u. per mole which would be liberated upon complete combustion to carbon dioxide.

Attached to and beneath the gyratory shelf supporting spider and centrally located within the annular cascade of solid fuel, as is shown in FIG. 5, is a water cooled refractory cone 73 within which is effected the secondary combustion of carbon monoxide to carbon dioxide. This combustion cone serves several purposes including the exclusion of solid carbon therefrom.

Oxygen is tangentially injected at high velocity about midway between the base of the cone through water jacketed and water cooled tangential injectors 43 and products of combustion (carbon monoxide) are withdrawn through off-take 41 at its vertex. By such tangential injection of oxygen at diesel firing pressure, the combustion reactions are speeded up and reach practical completion because of the surface catalysis effected by impingement upon the incandescent inner refractory surface of the combustion cone.

The temperature of the inner surface of the combustion cone is necessarily in the order of 3000° F. and, therefore, at least one thousand degrees Fahrenheit hotter than the swirling mass of entrained and cascading fuel and the upper surface of the solid fuel bed below toward which the incandescent conical surface must radiate. Therefore, the rate of radiant heat transfer to the solid fuel from the secondary combustion zone may be in the order of one million B.t.u. per hour per square foot of radiating surface; as can be calculated from the equation:

Net B.t.u./hr./sq. ft. radiated
$$=0.173\alpha\left[\left(\frac{T_e}{100}\right)^4-\left(\frac{T_a}{100}\right)^4\right]$$

where $\alpha$ is the correction factor of emissivity and absorptivity and $T_e$ and $T_a$ are temperature of the emitter and absorber, respectively, in degrees Rankine. For instance, a combustion cone seven feet in diameter will have a radiating surface approximately 60 square feet and, therefore, it is possible to continuously transfer by radiation around one million B.t.u. per minute from the secondary combustion of carbon monoxide to carbon dioxide. Thus, together with the transfer to the solid fuel of heat generated by oxidizing part of the solid fuel to carbon monoxide plus the heat radiated from the secondary combustion of carbon monoxide to carbon dioxide, there could be transferred to the fuel cascade more than one million B.t.u. per minute within each such combustion zone and without fusion of the ash.

The products of combustion leaving the secondary combustion zone through the vertex of the secondary combustion cone through a gas off-take attached thereto are at a temperature in the order of 3000° F. and will include a very small excess of oxygen. The heat leaving the system as sensible heat of the flue gases, therefore, represents about 23 percent of the total heat of combustion realized by burning carbon to carbon dioxide. Including six or seven percent of the heat of reaction of carbon to carbon dioxide as losses to the cooling water and to the surroundings through the refractory lining of the apparatus, there remains a net realization in order of some 70 percent as sensible heat absorbed by the descending solid fuel and unfused ash.

Summarizing, as to the combustion process, there is dual injection of oxygen: first, primary low velocity oxygen through tuyeres 37 into the turbulent mass using CO as an autogenous diluent, then secondary oxygen tangentially injected into combustion cone 73. This secondary injection of oxygen into the combustion cone 73 accomplishes the combustion of carbon monoxide to carbon dioxide with the generation of a high flame temperature catalyzed by the centrifugal impingement of both oxygen and carbon monoxide against the incandescent surfaces of the ceramic conical combustion chamber 73. This incandescent surface radiates most of the heat generated back into the turbulent fuel and to the gas entrained solids circulating in the blow-run zone immediately below. Since only carbon dioxide and a very small percentage of excess oxygen can leave the blow-run zone, the sensible heat of the existing carbon dioxide flue gas constitutes practically the total heat not available for the heating of the cascading fuel. (Of course, the heat loss to the surroundings through the refractory lined vessel and through the cooling fluid is an additional small portion of the total heat also not absorbed by the descending fuel.)

Because the gases are under substantial pressure, i.e., 20 to 30 atmospheres and therefore at diesel firing pressures, and because there are no diluents such as nitrogen or other inerts to slow down combustion, the combustion of carbon monoxide to carbon dioxide proceeds with a minimum of excess oxygen. Assuming a flue gas exiting temperature of 3000° F., approximately 23 percent of the heat of Reaction #5

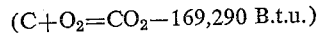

leaves with the sensible heat of the flue gas and more than 70 percent of the heat of reaction remains with the fuel in the blow-run chamber. Since this 23 percent of reaction can largely be recovered by the raising of steam in waste boilers and as the steam so generated is necessary to the operation of the system, no other regenerative or recuperative heat recovery adjuncts are required.

As shown in FIGS. 1 and 6, since the blow-run zones are confined by deep separating beds above and below such as the beds on shelves 40 and 45 which confine blow-run Zone B-1, combustion gases must leave through the blow-run gas off-take flue 41 located between the beds on shelves 40 and 45. Off-take flue 41 is constructed of refractory material capable of withstanding the high temperatures involved and exits into a vertical flue or catalyst chamber 46 also lined with refractory 48. The solids mixed with the combustion gas may be removed in chamber 46. For intermittently cleaning off-take duct 41 of obstructions, a telescoping fluid cooled auger 52 is provided in a chamber 54 aligned with duct 41 as shown in FIG. 6.

Due to the above described partial combustion, the partially burned fuel on deep separating bed 45 is again raised to a temperature just below the ash softening temperature, and is in turn fed off the periphery of the gyrating feeder shelf 45 and again cascades into another continuous water gas-make Zone M-2 wherein steam is again injected for the continuous production of water gas as described below.

Although for the sake of simplicity only two blow-run zones and two make-run zones are shown in FIG. 1, it is obvious that more of such dual sections may be used in the invention to effect the complete gasification of the fuel. The number of blow-run zones required and the number of subsequent gas-make zones required is a function of the rate at which fuel is introduced into the system and the rates at which oxygen and steam are injected at the various horizons. Also, as the carbon diminishes in proportion to the ash, more sensible heat will be transferred from the blow-run to the succeeding make-run per pound of carbon in the fuel. Actually, in the case of this invention, a high ash fuel such as anthracite culm is of no disadvantage in this respect.

The third and last section of the continuous gasification column includes the producer gas conversion Zone D and the fuel gleaning Zone E and the heat recovery Zone F.

Blow-run Zone B-2, which is the final blow-run zone shown in FIG. 1, is for the purpose of bringing the carbon and ash up to the maximum practical temperature as it arrives on beds 65 and 70 which constitute the final producer gas clean up Zone D. Oxygen and steam are introduced at inlet tuyeres 71 below shelf 70 and these fluids pass upwardly through the downwardly cascading hot solids and the shallow beds on shelves 65 and 70. Also steam as required for temperature control is introduced through inlet injectors 86 and passes upwardly. Outlet 77 handles this hot top producer gas having a low carbon dioxide and a low content of undisassociated steam.

To effect the final fuel gleaning and heat recovery functions, oxygen is introduced through tuyeres 81 into the heat recovery Zone F. Passing upward through the hot bed of ash on shelf 80, the oxygen picks up a substantial part of the sensible heat of the ash. As the last remnants of fuels are oxidized by the oxygen in the beds on shelves 75, 70, and 65 above shelf 80, the temperature of the gases will rise sharply. In order to keep the temperature of the ash below its fusion point, steam may be injected at 81 and 86 as required. Because free oxygen will still exist in this region of clean up, steam cannot be disassociated until sufficient carbon is encountered to remove all of the oxygen, whereupon steam and carbon dioxide are reduced to synthesis gas ($CO+H_2$) in passing through the very hot carbon retained on beds 65 and 70 which constitute the producer gas clean up Zone D.

This secondary gas producer illustrates the principle of feeding into a gas producer column a very hot fuel sufficient in temperature and amount as to cause a relatively complete reduction of the carbon dioxide and water vapor which may be contained in the producer gas generated at a lower horizon.

As the ash leaves shelf 80 and cascades down upon shelf 85, the carbon content has been reduced where no further combustion is possible. The amount of ash which accumulates above bell valve 90 is measured so as to be somewhat less in volume than ash discharge lock 95 so that upon opening bell valve 90, the ash resting on the valve 90 will not quite fill ash lock 95 and therefore will not interfere with the closing of the bell valve. In order to facilitate the closing and the gas-tight sealing of bell valve 90, gyratory feeder shelf 85 is momentarily stopped so that the bell valve seat will be free from solids during its closing.

The practically unfused, partially cooled ash is discharged from ash lock 95 into ash bin 105 by depressurizing the discharge lock 95, by closing valve 92 and opening blow-down vent valve 91 to the atmosphere. Bell valve 100 may then be opened to dump the ash lock contents into the ash bin which is sufficient in size as to receive the entire lock content and to permit subsequent free closing of bell valve 100. The ash lock is re-pressurized by closing valve 91 and opening valve 92 to admit non-combustible flue gas from a reservoir at system pressure.

The product gas leaving the vertical vessel through off-take 77 in Zone D, and ducts 38 and 47 in Zones B-1 and B-2 may enter a knock out stack 49 similar in construction to knock out stack 46. A suitable heat exchanger 51 is positioned in the product gas outlet line for the purpose of raising steam used in the system by utilizing the heat of the product gas, thus further contributing to the thermal efficiency of the system.

Since the $CO_2$ flue gas is passed through drying and preheating Zone A and the product gas is passed through heat exchanger 51, both for heat exchange purposes, it would be possible to reverse their heat exchange functions although the result would not be as desirable.

In order that this method for the dry ash gasification of solid fuels may be better understood, the procedure for starting up and operating the gasification system is described briefly here below:

The gasifier is first purged of air by injecting stored flue gas or nitrogen or some other readily obtainable fluid, other than steam, which in non-explosive and non-reactive in respect to finely divided carbon at start-up temperatures.

Anthracite culm or other carbonaceous solid material having been crushed through a ¼-inch slotted screen, and including all fines, is charged into the measuring bin 10 at the top of the continuous, cylindrical vessel. While the system is at atmospheric pressure, the measuring bin 10 is dumped repeatedly through the charging lock and onto the system feeder 24 which continuously meters the crushed solid fuel to the various beds below until each bed has a suitable depth of crushed material retained thereupon as indicated by a satisfactory fluid pressure drop through each bed of crushed fuel. Means of automatically regulating the depth of each fuel bed as a function of the pressure drop therethrough is described in my application Serial No. 17,293 which also describes the mechanical appurtenances of the gasifier and its system of controls.

Following the purging of the system by a suitable gas and after proper loading of the solid combustible materials upon the various gyratory shelves throughout the system, ignition torches, such as oxy-acetylene, are inserted into the fuel bed on shelf 25. While the ignition torches are playing upon the fuel bed at shelf 25, observable through suitable peep sights, oxygen injections is begun through the radial tuyeres 26.

After combustion is observed to proceed vigorously in front of the peep sights at the horizon of the several ignition torches which are inserted into the fuel bed on shelf 25, the gyrating shelf mechanisms are set in motion at low speed. Fuel, heated to about 2000° F., cascades off the periphery of shelf 25 into the oxygenated zone between shelves 25 and 30. Partial combustion of the heated, cascading fuel occurs as it falls from beds 25 and 30, also observable through peep sights. At start up, the products of combustion (primary producer gas) pass out through producer gas off-take duct 44 and through a selectively open vent to the atmosphere (not shown).

The entire system is at first operated with the single combustion zone between beds 30 and 25 in order to preheat the solid fuel throughout the entire column. Heated, partially burned solid fuel fills each bed below shelf 25 to the required depth. After the various fuel beds have been raised to a sufficient temperature, oxygen injection is also begun through the radial tuyeres in Zones B-1, B-2, etc., and in the final fuel gleaning Zone E.

When carbon monoxide, exiting through the vertex of each secondary combustion cone in each blow-run Zone B-1, and B-2 has risen in temperature well above its ignition point, oxygen is admitted through the tangential tuyeres 43. Oxygen admission into the secondary combustion cones is gradually increased until the carbon monoxide content of the flu gases has reached a satisfactorily low level.

The glow-run flue gas, exiting from the secondary combustion zones at about 3000° F., is passed concurrently through the incoming raw fuel and transfers about three-quarters of its sensible heat thereto. The continuous blow-run flue gas finally passes to the atmosphere at a temperature of 700° to 800° F.

As is mentioned above, oxygen which is injected through tuyeres 26 into the primary gas producer Zone C may be diluted with recycled, non-reacting (with carbon) hydrogen and carbon monoxide in order to reduce the tuyere temperature below the ash fusion point and, at the same time, to furnish sufficient total heat capacity of the producer gas to heat the incoming fuel to the desired water gas reaction temperature.

When the partially oxidized carbonaceous material, cascading from beds 30 and 35, has reached a temperature close to the ash fusion point, steam injection is begun at 26 and water-gas production commences in Zone M–1. Likewise, as the heated fuel reaches the continuous blow-run Zone B–1 at a temperature still somewhat above its kindling temperature, say 1500° F., primary and then secondary oxygen injection is begun between beds 40 and 45 and the continuous blow-run Zone B–1 also comes into operation. Similarly, steam is injected into the continuous water-gas make Zone M–2 as the temperature permits, and so on. Thus, the whole continuous water-gas section comes into operation.

Oxygen injection is begun at 81 as soon as the temperature of the descending fuel at that point insures ignition. As the ascending gases rise sufficiently in temperature, steam injection is begun at 86 and 71, and so the secondary producer gas and fuel gleaning section also comes into operation.

Following the complete ignition of the system at substantially atmospheric pressures, the several gas outlet valves are gradually closed and the system is brought up to the desired operating pressure by the injection of pressurized oxygen, steam and recycled gas.

Under full operation, for a given injection rate of oxygen and steam throughout the system, the crushed fuel is fed into the system at a rate such that no combustible fuel arrives at a horizon below shelf 80. Full fluid injection rate will have been reached when the carry-over of entrained solids into the various gas off-takes starts becoming excessive.

It is contemplated that by the use of suitable heat regenerative apparatus added to the system, air as well as industrial oxygen may be employed for the blow-run combustion.

In case it becomes desirable to produce a "Lurgi" type fuel gas containing 5 to 8 percent of methane and a calorific value of 400 to 450 B.t.u. per cubic foot, this system may be so employed. In order to promote methanation reactions and also to favor the reaction $$2H_2O+C=2H_2+CO_2$$

it is merely necessary to change the direction of steam flow from upward to downward through each gasification fuel bed. The net result is to lower the final reaction temperature of the gas and fuel.

The following heat balance of this dry ash gasification system is based upon the production of 1000 standard cubic feet of hydrogen plus carbon monoxide from anthracite culm. The material to be gasified is assumed to contain 40 percent of carbon, one percent of hydrogen and 59 percent of ash on a moisture-free, sulfur-free basis. Industrial oxygen is the gasifying medium. The nitrogen content of the fuel and of the gasifying oxygen are neglected as is the moisture and sulfur of the fuel in the following illustrative example.

In the continuous production of blue water gas by this method, the predominate reaction is 18 lb. $H_2O+12$ lb. $C=2$ lb. $H_2+28$ lb. $CO+75,535$ B.t.u. That this reaction occurs to the practical exclusion of all others is made possible through accurate and uniform control of fuel bed temperature. The top of each moving fuel gasification bed is maintained at a temperature above which reactions $C+2H_2O=CO_2+2H_2$, or any of the methanation reactions occur to any appreciable extent.

The pound molal endothermic heat requirement for $H_2O+C=H_2+CO$ is 75,535 B.t.u. with reactants and products at 60° F. and one atmosphere and water in the liquid phase. For 1000 standard cubic feet of hydrogen and carbon monoxide produced by the above reaction, 99,910 B.t.u. must be supplied as 2.64 mols of gas are involved.

In this continuous system, the major heat requirements are met by burning carbon to carbon dioxide in industrial oxygen. However, in the fuel gleaning zone wherein the final impoverishment of the ash is achieved, a small percentage of the carbon is burned to carbon monoxide.

The primary and final sections of the apparatus are gas producers rather than water gas systems. However, the total contribution of the primary and final gas producer sections are relatively small and does not greatly affect the following heat balance based on the continuous water gas section.

In the following example, the heat balance is based on the gasification of dry anthracite culm containing 40 percent of carbon, one percent of hydrogen and 49 percent of ash. Moisture and sulfur are neglected. The heat balance is first considered without the contribution of the contained hydrogen and of other volatile matter to the volume of product gas.

HEAT BALANCE WITHOUT FUEL VOLATILE MATTER

*Heat Leaving the Gasification System per M s.c.f. of $H_2+CO$ (Based on Carbon Alone)*

| Item: | B.t.u. per 1000 standard cu. ft. of $H_2+CO$ |
|---|---|
| (A) Gross heating value of the product gas; 2.64 mols of $H_2+CO$ | (324,000) |
| (B) Endothermic heat of reaction, per 1000 M s.c.f. | 99,900 |
| (C) Sensible heat of the product gas leaving at 2000° F. | 40,000 |
| (D) Credit 23 pounds of steam raised from the sensible heat of the product gas, steam at 300 p.s.i.a. and saturated | (−27,600) |
| (E) Sensible heat of blow gas at 700° F. after flowing concurrently through the incoming fuel 0.03 B.t.u./ft.³/° F., 313 s.c.f. | 6,600 |
| (F) Calorific value of blow gas | Nil |
| (G) Sensible heat of ash at 500° F. | 4,500 |
| (H) Calorific value of ash, 4% of original | (16,000) |
| (I) Cooling water loss, 2% | 8,000 |
| (J) Radiation and unaccounted for, 3% | 12,000 |
| (K) Calorific value (carbon only) of anthracite culm is 5640 B.t.u. per pound. | |

Continuous blow-run function, carbon requirement: From the above heat balance, based only upon the calorific value of the carbon content of the fuel, the sum of items B, C, E, G, I, and J, less item D, total 143,400 B.t.u. In order to derive this much heat by burning carbon to carbon dioxide in oxygen as the reaction 12 lb. $C+32$ lb. $O_2=44$ lb. $CO_2-169,290$ B.t.u. indicates, 143,400 B.t.u./5300 B.t.u. per pound of $O_2$, shows that 27.1 pounds of oxygen is required. Also from the same equation, 143,400 B.t.u./14,100 B.t.u. per pound of carbon, shows that 10.19 pounds of carbon is required.

Continuous water gas function, carbon requirement: In order to produce one thousand standard cubic feet of blue water gas by the reaction $H_2O+C=H_2+CO$, 1.32 mols or 15.84 pounds of carbon is required.

Apparent total carbon requirement: Thus, from the above heat balance, to satisfy both the heat generating and the gas producing functions, a total of 26.03 pounds of carbon is necessary in order to produce 1000 standard cubic feet of water gas from a purely carbonaceous fuel by this gasification system. To this is added the estimated ash loss of four percent which makes a total carbon requirement of 27.2 pounds.

Apparent oxygen requirement and blow gas volume: The amount of industrial oxygen required for combustion of carbon to $CO_2$ to furnish the heat for items B, C, E, G, I and J is 143,400 B.t.u./5300 B.t.u. per pound of $O_2$ or 27.1 pounds of oxygen. At 11.84 cubic feet per pound, the total oxygen requirement is 27.1×11.84, or 323 cubic feet per M s.c.f. of $H_2+CO$ (without adjustment for the hydrogen or volatile matter in the fuel).

Still assuming that the anthracite culm is 40 percent carbon and evolves no hydrogen, to provide 27.2 pounds of carbon, 27.2/0.40, or 67.7 pounds of culm would be required. (This is readjusted below to total 23.7 pounds of carbon when the recoverable hydrogen of the fuel is considered.)

Hydrogen contribution of the product gas volume: Upon heating to incandescence, anthracite culm of this grade may be expected to yield about one percent of its weight as elemental hydrogen. Therefore, the volume of hydrogen would be $67.7 \times 0.01 \times 379$ ft.$^3$/2.016 or about 128 cubic feet of hydrogen.

Thus, the volume of product gas from 67.7 pounds of culm is 1128, or 112.8 percent of the initial volume upon which the first heat balance is drawn.

Raw materials requirement: Since such a problem may be solved by trial and error for any size apparatus, the first approximation is that both the actual fuel and oxygen requirements are somewhat less than first estimated. Hence, by readjustment of items B, E and G downward 12.8%, and also adjusting the blow-run carbon, the system would require approximately 65 pounds of culm and about 289 cubic feet of oxygen per 1000 standard cubic feet of $H_2+CO$ as product gas as can be calculated from the following heat balance which takes into account the volatile matter.

Also, since the fuel is one percent hydrogen, the calorific value increases from 5640 to 6260 B.t.u. per pound. However, this affects only items B, D and K.

HEAT BALANCE WITH FUEL VOLATILE MATTER

| Item: | B.t.u. per 1000 s.c.f. of $H_2+CO$ |
|---|---|
| (A′) Gross heating value of the product gas; 2.64 mols of $H_2+CO$ | (324,000) |
| (B′) Endothermic heat of reaction, 2.64 mols, less 12.8% | 87,800 |
| (C′) Sensible heat of the product gas at 2000° F | 40,000 |
| (D′) Credit 21 pounds of steam raised from the sensible heat of the product gas, steam at 300 p.s.i.a. and 600° F | (−27,600) |
| (E′) Sensible heat of blow gas at 700° F. after flowing concurrently through the incoming fuel. 0.03 B.t.u./ft.$^3$/° F., 289 s.c.f | 5,800 |
| (F′) Calorific value of blow gas | Nil |
| (G′) Sensible heat of ash at 500° F | 4,500 |
| (H′) Calorific value of ash, 4% of original fuel | (16,000) |
| (I′) Cooling water loss, 2% | 8,000 |
| (J′) Radiation and unaccounted for, 3% | 12,000 |
| (K′) Calorific value (40% carbon plus 1% hydrogen) 65 pounds of anthracite culm 6260 B.t.u. per pound | 408,000 |

System gasifier efficiency: Calorific value of gas divided by the calorific value of the fuel, $324/408 \times 100$ or 77.4% cold efficiency.

In view of the foregoing it can be seen that, while other solid fuels gasification systems generally require that the gasification reactions be completed within a single fuel bed or within a single chamber, this invention provides a number of superimposed continuous reaction zones and only partial reactions need be performed in any single fuel bed or chamber. At which particular horizon within the gasification apparatus the complete utilization of the combustible material is finally accomplished is strictly a function of the fuel feed rate and of the zonal inflow rates of oxygen and steam. By incorporation of the final fuel gleaning gas producer zone, the ultimate impoverishment of the ash is insured.

This system for the gasification of solid fuels employs a new principle embodied by the continuous, uniform annular cascade of solid fuel which is heated by partial, continuous combustion and which is subsequently used for continuously generating water gas in alternate zones within a single vertical vessel.

The extraordinarily high solid fuels gasification rate of this system is due principally to the fact that both the combustion (fuel heating) and the gasification (endothermic) reactions are simultaneously performed within separate but continuously moving, multiple fuel beds. In effect, the aggregate fuel bed area of this apparatus is some ten-fold greater than what is possible in the Lurgi system, yet the outside diameters of the containing vessels, and, therefore, the structural stresses imposed by the internal pressures are comparable.

As a further insurance of high material throughput capacity without interruption, this gasifier apparatus is designed to pass chunks of agglomerate below a predetermined size and to crush larger chunks of agglomerate without interference or shutdown of the gassification process. On the other hand, the formation of any such chunks of fused ash and/or agglomerated fuel inevitably forces the shutdown of the Lurgi gasifier and of such other systems as the fluidized-bed gasifiers.

It is contemplated that the continuous partial combustion of descending solid fuels described above, could be modified by injecting steam into the solid fuel cascade rather than primarily oxygen. Steam may be injected radially about one-third of the way down into the moving bed of solids at the lower end of each reaction chamber. Thus, instead of burning only carbon monoxide to carbon dioxide in the secondary conical combustion chamber, as is the case of the first example, hydrogen plus carbon monoxide would be burned to water vapor and carbon dioxide and all of the heat for the reaction would be furnished by radiation therefrom. The product gas would be withdrawn from each chamber through gas off-takes opposite the edges of the gyratory shelf at the top of the chamber. Thus, the continuous, water gas system utilizing alternate chambers for the make-gas and blow-run could be supplanted by a single chamber or single cell continuous water gas system.

While there have been shown and described and pointed out the fundamental novel features of the invention as applied to the disclosed preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A gasification system for the continuous production of gases utilizing solid fuels comprising; a continuous vertical pressurized vessel through which solid fuel may flow vertically downward in a controlled manner, a plurality of gyratory feeder shelf units vertically spaced at various horizons within the pressurized vessel and adapted to retain a predetermined amount of solid fuel thereon and feed the solid fuel therefrom at a predetermined rate so that selected ones of the gyratory feeder shelf units may retain a sufficient amount of solids to create an effective gas seal by carrying deep separating beds of solids, means for continuously introducing an oxidizing gas into the fuel as it is continuously fed downwardly in the vessel to react with the carbon in the fuel and thereby heat the solid fuel to a temperature below its ash fusion temperature, means for passing steam into contact with the hot dry ash fuel within the vessel between a pair of deep separating beds to chemically react with the hot fuel for continuously producing water gas, and means for withdrawing the water gas so produced from the pressurized vertical vessel.

2. A gasification system for the continuous dry ash generation of hydrogen and carbon monoxide gases from solid fuels, the system comprising; a continuous vertical pressurized vessel through which solid fuel may flow vertically downward in a controlled manner, a plurality of gyratory feeder shelf units vertically spaced at various horizons within the pressurized vessel and adapted to retain solid fuel thereon in predetermined amounts and feed the solid fuel therefrom at desired rates so that certain selected ones of the gyratory feeder shelf units retain a sufficient amount of solids to create an effective gas seal by means of deep separating beds, means for continuously introducing an oxidizing gas into the fuel as it is fed downwardly in the vessel between a pair of deep separating beds on the gyrating feeder shelf units, the oxidizing gas reacting with the carbon in the fuel and heating the solid fuel to near its ash fusion temperature, means for continuously passing steam into contact with the hot dry ash fuel between another pair of deep separating beds carried on gyratory feeder shelf units to chemically react with the hot fuel for producing hydrogen and carbon monoxide gases; i.e. water gas, and means for withdrawing the gases so produced from the vertical vessel.

3. A system as defined in claim 2 further comprising a heat exchanger in heat exchange relation with the product gases withdrawn from the vertical vessel for furnishing heat required for raising the steam to be passed to the contact with the hot solid fuel, and means for passing the flue gas from the oxidation reactions concurrently through the solid fuel being fed vertically downward within the vessel prior to the time the solid fuel is initially oxidized between the deep separating beds.

4. A system as defined in claim 2 wherein the deep separating beds define multiple gas separated functional zones contiguous to one another, an upper zone for introducing said oxidizing gas thus first oxidizing the fuel to raise the temperature to just below the ash fusion temperature, and immediately followed by said continuously operable means for introducing steam into contact with the hot fuel for producing water gas by reaction therewith, and further comprising at least one additional set of said functional zones contiguous with said recited zones for further and continuously oxidizing the fuel and zones for further and continuously producing water gas.

5. A system as defined in claim 4 wherein the means for passing steam into the zones separated by deep separating beds for producing water gas by reaction with the hot fuel is positioned to pass the steam from below a gyrating shelf unit carrying a bed of hot fuel so that the gas generating beds through which the steam is passed to make water gas are always hotter on their top due to continuous downward feeding of additional hot fuel than on their bottom where the steam first contacts the bed for entering and passing therethrough.

6. A system as defined in claim 5 further comprising additional gyratory shelves defining a functional zone for fuel cleaning and gleaning positioned below the zones of the vessel used for heating the fuel and producing water gas, the fuel gleaning and cleaning zones being provided with means for introducing steam and oxygen as required into the nearly spent fuel as it is fed vertically downward by the gyratory feeder shelf units.

7. A method for the generation of hydrogen and carbon monoxide gases, i.e. water gas, from solid fuels, the method comprising; continuously feeding a relatively uniform annular cascade of solid fuel vertically downward within a pressurized vessel, controlling the vertical downward feed at a plurality of horizons within the vertical vessel and simultaneously effectively gas separating fluid flow in the vessel at selected ones of these horizons by maintaining the solid fuels at the selected horizons to provide sufficient impedance to fluid flow across the selected horizon, continuously partially oxidizing and thereby heating the solid fuels in a combustion zone between a pair of the gas separated horizons to a temperature just below the ash fusion point of the fuel without causing any ash fusion and in a contiguous adjacent horizon immediately below the combustion zone introducing steam into contact with the heated dry ash fuel to generate water gas.

8. A method for continuous generation of hydrogen and carbon monoxide gases, i.e. water gas, from a high ash solid fuel comprising; continuously feeding the solid fuel vertically downward within a pressurized vessel, dividing the vessel into a number of horizons at selected points by accumulating a sufficient amount of a solid fuel to form an effective gas seal, performing partial combustion in at least one zone between a pair of effective gas seals, and generating water gas in a subsequent zone between a pair of effective gas seals by contacting the hot dry ash solid fuel with steam, and repeating the steps of performing partial combustion and generating water gas alternately until substantially all of the fuel is reduced to ash.

9. A method as defined in claim 8 further comprising preheating the solid fuel by heat exchange with the products of partial combustion and generating the steam used to contact the hot dry ash solid fuel by heat exchange with the product water gas.

10. A method as defined in claim 8 further comprising passing the steam through the hot dry ash solid fuel from the coldest side of a bed thereof to the hottest side of the solid fuel bed and continuously feeding additional hot fuel to the hottest side of the bed.

11. A method as defined in claim 10 wherein the partial combustion in each combustion zone is performed in two steps, first introducing oxygen at low velocity to react with the solid fuel and produce carbon monoxide which in itself functions as an autogeneous diluent and secondly injecting oxygen into the carbon monoxide to react to product carbon dioxide and utilizing the heat produced by the latter reaction to aid in the pratial combustion.

12. A method for the generation of hydrogen and carbon monoxide gases, i.e. water gas, from solid fuels, the method comprising continuously feeding a relatively uniform annular cascade of solid fuels vertically downward within a pressurized vessel, controlling the vertical downward feed at a plurality of horizons within the vertical vessel, effectively separating gas flow within the vessels at selected ones of these horizons by maintaining the solid fuel at selected horizons in sufficient quantity to impede gas flow through these selected horizons, continuously heating the solid fuels by partial combustion in a combustion zone between a pair of the gas separated horizons to a temperature just below the ash fusion point of the fuel without causing any ash fusion, introducing steam into contact with the heated dry ash fuel to generate water gas and withdrawing the water gas generated.

References Cited in the file of this patent

UNITED STATES PATENTS

| | | |
|---|---|---|
| 881,110 | Lea | Mar. 3, 1908 |
| 1,866,399 | De Baufre | July 5, 1932 |
| 1,977,684 | Lucke | Oct. 23, 1934 |